United States Patent Office 3,192,457
Patented June 29, 1965

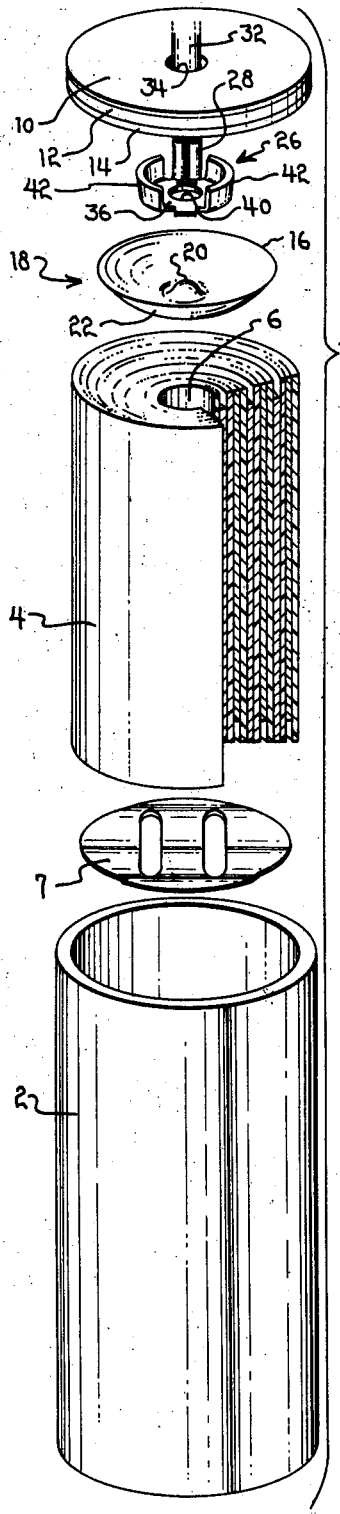
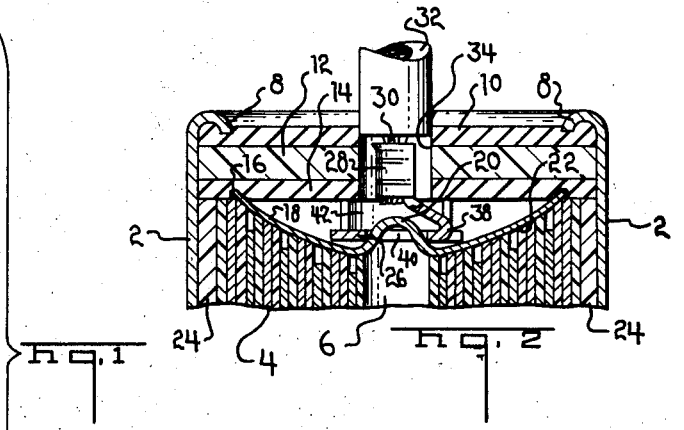
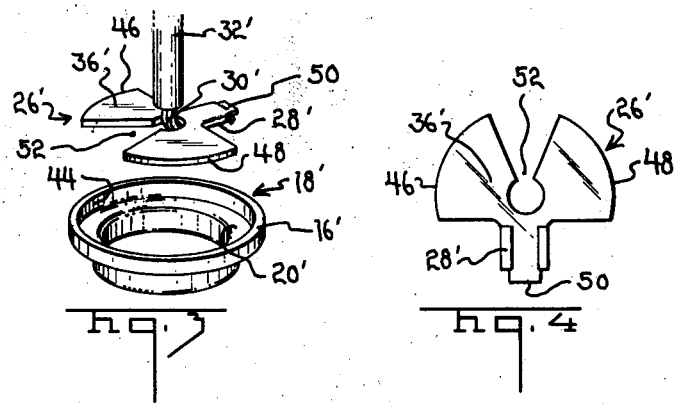
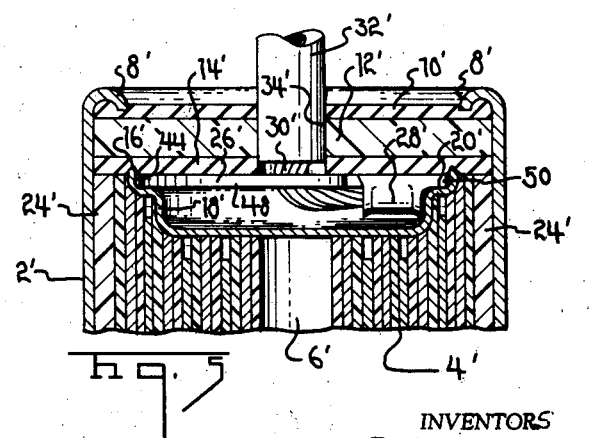

3,192,457
ELECTRICAL CONTACT ASSEMBLY FOR
ELECTRICAL CONDENSERS
David Robert Crockett, Orpington, and Leslie Harris,
Boreham Wood, England, assignors to AMP Incorporated, Harrisburg, Pa.
Filed May 1, 1962, Ser. No. 191,609
Claims priority, application Great Britain, May 11, 1961,
17,165/61
5 Claims. (Cl. 317—260)

This invention relates to electrical contact assemblies for electrical condensers comprising alternate layers of insulating material and metal foil.

Such condensers usually comprise a hollow cylindrical metal casing closed at one end and open at the other and containing a capacitor body made from strip material, for example metal foil and paper strip, insulating material coated with metal, or metal foil coated with insulating material. The body is formed by rolling the strip material to form a cylinder composed of alternate layers of the metal and insulating material, the metal constituting the condenser plates and the insulating material, dielectric layers between the plates.

The layers are staggered so that alternate metal layers are displaced from the remaining metal layers axially of the casing, one set of metal layers making electrical connection with the closed end of the casing which is normally sealed when the condenser is connected for use and the other set of metal layers making electrical connection with a button contact insulated from the casing. This contact is retained in the casing by an insulating seal in the open end of the casing. The contact has soldered thereto an electrical lead extending through the seal and constituting means for connecting the contact to an external circuit. The casing thus forms one terminal of the condenser and the button contact the other. The contact normally comprises a circular brass plate having a central aperture receiving the lead, the plate being usually dip soldered in an individual solder bath to fix the lead in the aperture and to form a convex contact surface on the plate, the solder bath being shaped in accordance with the contact surface required. The contact is thus undesirably costly to make particularly because of the considerable expenditure of time involved in the dip soldering.

It is therefore, an object of the present invention to provide an electrical contact assembly for connecting alternate plates of an electrical capacitor body composed of rolled strip material and disposed in a casing to an electrical lead, comprising a metal dish adapted to abut one end of the body to make electrical contact with the edges of alternate capacitor plates of the body, and an electrical connector having a ferrule-forming portion for crimping to an electrical lead. The connector comprises a contact portion adapted to engage the inner surface of the dish to position the ferrule-forming portion relative to the dish in cooperation with a seal for closing one end of the casing.

Other objects and attainments of the present invention will become apparent to those skilled in the art upon a reading of the following detailed description when taken in conjunction with the drawings in which is described several embodiments of the invention; it is to be understood however, that the embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

The preferred embodiments will now be described by way of example with reference to the accompanying drawings in which:

FIGURE 1 is an exploded view of the capacitor, the contact and dish assembly of one embodiment of the invention: the lead wire terminated to the contact is also shown, as well as the other condenser parts;

FIGURE 2 is a cross-sectional view of the upper end of the capacitor showing the assembled contact and dish of the embodiment of FIGURE 1;

FIGURE 3 is an exploded perspective view of another embodiment of the invention; this view shows a contact element, lead wire and contact dish;

FIGURE 4 is a bottom plan view of the contact showing the side opposite that illustrated in FIGURE 3;

FIGURE 5 is a cross-sectional view similar to FIGURE 2 showing the embodiment of FIGURE 3.

Reference will now be made to FIGURES 1 and 2. An electrical condenser has a tubular metal casing 2 having an open upper end and a closed lower end. A capacitor body 4 contained in the casing, comprises alternate layers of metal forming the capacitor plates and insulating material forming dielectric layers between the plates wound about the central bore 6. The disclosed type of capacitor body has two strips of metal foil which are convolutely wound and which are separated by strips of insulating material. The two strips are of the same width but are of a width less than the width of the insulating material. Prior to winding the capacitor, the strips of foil and insulating material are superimposed on each other with one foil strip having an edge in alignment with one edge of the insulating strip and with the other strip having its edge in alignment with the other edge of the insulating strip. Upon winding, one of the strips of foil will have its edge on the upper surface of the body 4 while the other strip will have its edge on the lower surface of body 4.

In the embodiment shown, electrical contact is made between the casing 2 and the lower strip of the capacitor body by means of a disc 7 having an arcuate cross section so that it can function as a compression spring. This disc is merely placed in the casing 2 and the capacitor body positioned on top of the disc.

The open upper end of the casing 2 has a free edge which is bent over to provide a flange 8 directed axially inwardly of the casing 2. The flange 8 bears against a synthetic rubber, e.g. neoprene, outer coating 10 of a seal 12 of resin impregnated paper, e.g. paxolin, which has an inner coating 14, similar to the coating 10.

A metallic dish 18 is disposed coaxially in the casing between the upper end of the capacitor body 4 and the lower surface of inner coating 14. The free edge 16 which is formed as a knife edge, of circular metal dish 18 is pressed into the coating 14 in moisture-proof fashion, the outer surface 22 of the dish 18 abutting the end of the body 4. The foil layers are staggered as described above so that alternate metal layers are displaced from the remaining metal layers axially of the body 4 to make electrical contact with the casing 2 by means of disc 7 as described above. The remaining metal layers are electrically connected to the surface 22 of the dish 18. Further insulating material 24 is disposed between the cylindrical outer wall of the body 4 and the cylindrical inner wall of the casing 2. The said casing 2 thus forms one terminal of the condenser and the dish 18 the other.

An electrical connector 26 has a ferrule forming portion 28 crimped to the bared end 30 of the conductor wires of an electrical lead, the insulation 32 of the lead extending into an aperture 34 through the seal. The connector 26 also has a metal contact plate 36 coaxial with and spaced from the portion 28, the plate 36 having a goose-neck 38 connecting it to the portion 28. A central recess 40 in the plate 36 receives the boss 20 of the dish 18 and thus locates and centers the dish relative to the portion 28. The plate 36 has flanges 42 extending perpendicularly therefrom in the axial direction of the portion 28 and abutting the coating 14 to prevent axial movement of the connector 26 outwardly of the casing 4 so that the plate 36 is retained in firm contact with the dish 18 and the said dish 18 in firm contact with the body 4.

Moisture-proof sealing of the capacitor body 4 from the atmosphere is achieved by the engagement of flange 8 with the coating 10 and the engagement of the edge 16 of the dish 18 with the coating 14.

The free edge of the flange 8 is substantially in alignment with the edge 16 of the dish 18 to reduce bending stress on the seal.

A further embodiment of the invention will now be described with reference to FIGURES 3, 4 and 5. In the description which follows the same reference numerals, differentiated by prime marks, are used to denote the parts of the embodiment of FIGURES 3–5 which are present in the embodiment of FIGURES 1 and 2.

A circular metal dish 18' the free edge 16', which is formed as a knife edge, is pressed into the coating 14' in moisture-proof fashion and the outer surface of which abuts the end of the body 4' to make electrically conductive contact with alternate capacitor plates of the body 4' in the manner of the dish 18' of FIGURE 2, dish 18' has an annular shoulder 20', extending radially inwardly from an inner side wall 44 of the dish.

An electrical connector 26' has a ferrule forming portion 28' (shown in its uncrimped state in FIGURE 4), adapted to be crimped to a lead end 30'. The contact portion of the connector comprises a plate 36' formed as a bifurcated spade terminal having arcuate peripheral surfaces 46 and 48 of slightly less radius than the wall 44, and a contact projection 50, the plate 36' and the projection 44 extending from opposite ends of the portion 28'. The arms of the plate 36' define a slot 52.

The connector 26' extends across the mouth of the dish so that the surfaces 46 and 48 abut corresponding portions of the wall 44. The lower peripheral surfaces of the plate 36' (i.e. the underside) and the underside of the projection 50 abut the shoulder 20'. The ferrule 28' lies within the dish 18', and the lead core extends through the slot 52. The underside of the coating 14' abuts the upper surface of the connector 26' so that the plate 36' and the projection 50 cooperate with the seal to locate the portion 28' relative to the dish 18', the plate 36' and the projection 50 being trapped between the shoulder 20' and the lower surface of the seal. The edge 16' penetrates the coating 14' so that the connector 26' is securely fixed in position in firm electrical contact with the shoulder 20'.

The aperture in the seal may be such that the connector 26' can be inserted through it for engaging the shoulder after the seal has been located in the casing but before the flange edges 8 have been turned over to engage the seal.

While there have been illustrated and described fundamental novel features of the invention, it will be understood that various omissions and substitutions and changes in the form and details of the contacts illustrated and their operation may be made by those skilled in the art without departing from the spirit of the invention. It is the intention, therefore, to be limited only as indicated by the scope of the following claims.

We claim:

1. An electrical condenser comprising a tubular metallic casing closed at one end, a capacitor body of rolled strip material in the casing, a first set of capacitor plates formed by the material and being in electrical connection with the closed end, a second set of capacitor plates axially displaced from the first set, a metallic dish in electrical connection with the plates of the second set and being disposed between the capacitor body and the other end of the casing, a seal having an aperture therethrough disposed between the dish and the other end of the casing, a curled rim on the other end of the casing having a free edge in engagement with the seal, an electrical connector disposed between the seal and the dish, a ferrule-forming portion on the connector, an electrical wire extending through the aperture of the seal and being secured within the ferrule-forming portion, an annular edge on the dish extending into the seal, said dish having locating means thereon, and a contact portion on the connector, the contact portion lying within the dish and engaging the locating means of said dish to locate the connector relative to the dish.

2. An electrical condenser comprising a tubular metallic casing closed at one end, a capacitor body of rolled strip material in the casing, a first set of condenser plates formed by the material, a second set of condenser plates formed by the material and being offset from the first set of plates axially of the body to make electrical contact with the closed end of the casing, a metal dish having an inner surface and an outer surface, the outer surface being in contact with the plates of the first set, a boss located centrally of the inner surface of the dish, an annular sharp free edge on the dish, a seal disposed between the dish and the other end of the casing, a curled-over edge of the other end of the casing in abutment with the seal to urge the seal against the sharp edge of the dish, an electrical wire extending through an aperture in the seal, an electrical connector disposed between the seal and the dish having a ferrule-forming section secured to the wire, an annular contact portion on the connector and surrounding the boss, and an upstanding flange on the contact portion in engagement with the seal to urge the contact portion against the boss.

3. An electrical condenser comprising a tubular metal casing closed at one end, a capacitor body of rolled strip material in the casing, a first set of capacitor plates provided by the material and being in electrical connection with the closed end of the casing, a second set of capacitor plates provided by the strip material and being axially offset from the first set of capacitor plates, a seal located between the capacitor body and the other end of the casing, a metal dish disposed between the seal and the capacitor body and having an outer surface in connection with the plates of the second set and an annular edge extending into the seal, a curled-over edge on the other end of the casing in abutment with the seal to urge the seal against the annular edge, a wire extending through an aperture in the seal, an annular shoulder provided by the inner surface of the dish, an electrical connector having a ferrule-forming section secured to the wire, and a contact portion on the connector extending transversely of the dish and being gripped between the seal and the shoulder.

4. An electrical condenser according to claim 3, in which the contact portion is a flat metal plate having an aperture through which the wire extends and the ferrule-forming section is located between the contact portion and the inner surface of the dish.

5. An electrical condenser according to claim 3, in which the contact portion is a flat metal plate having a slot extending from the periphery of the plate to the center thereof, the wire passing through the slot, the ferrule-forming section being formed by an extension from one edge of the plate and lying between the plate and the inner surface of the dish.

References Cited by the Examiner

UNITED STATES PATENTS

| | | | |
|---|---|---|---|
| 2,323,124 | 6/43 | Edmundson | 317—260 |
| 2,539,332 | 1/51 | Schneider | 317—260 |
| 3,109,127 | 10/63 | Guetersloh | 317—260 |

LARAMIE E. OSKIN, *Primary Examiner.*

DARRELL L. CLAY, JOHN F. BURNS, *Examiners.*